(12) United States Patent
Lee et al.

(10) Patent No.: US 8,255,506 B2
(45) Date of Patent: Aug. 28, 2012

(54) METHOD AND APPARATUS FOR MANAGING NETWORKS

(75) Inventors: Jun Seob Lee, Daejeon (KR); Yong Woon Kim, Cheonan (KR)

(73) Assignee: Electronics and Telecommunications Research Institute, Daejeon (KR)

(*) Notice: Subject to any disclaimer, the term of this patent is extended or adjusted under 35 U.S.C. 154(b) by 215 days.

(21) Appl. No.: 12/432,000

(22) Filed: Apr. 29, 2009

(65) Prior Publication Data

US 2010/0057897 A1 Mar. 4, 2010

(30) Foreign Application Priority Data

Aug. 27, 2008 (KR) .................. 10-2008-0084012
Nov. 13, 2008 (KR) .................. 10-2008-0112873

(51) Int. Cl.
*G06F 15/173* (2006.01)

(52) U.S. Cl. ........ 709/223; 709/219; 709/222; 709/224; 707/10; 707/758

(58) Field of Classification Search .................. 709/219, 709/222–224; 707/10, 758
See application file for complete search history.

(56) References Cited

U.S. PATENT DOCUMENTS

2002/0161751 A1* 10/2002 Mulgund et al. .................. 707/3
2005/0275532 A1* 12/2005 Ferri et al. ............... 340/539.26
2009/0210075 A1* 8/2009 Moriwaki ....................... 700/28

FOREIGN PATENT DOCUMENTS

KR 10-2008-0001585 1/2008
KR 10-2008-0056361 6/2008

OTHER PUBLICATIONS

Fenghua Yuan et al., "A Lightweight Sensor Network Management System Design", Sixth Annual IEEE International Conference on Pervasive Computing and Communications, pp. 288-293.

* cited by examiner

*Primary Examiner* — Wing Chan
*Assistant Examiner* — Benjamin M Thieu
(74) *Attorney, Agent, or Firm* — Staas & Halsey LLP

(57) ABSTRACT

Provided is a method and apparatus for managing networks. The method includes defining a set of managed objects of each of the networks to be managed, sending a request for information about the set of managed objects to an agent of the networks to be managed, and recognizing manageable managed objects based on information representing the managed objects, which is transmitted from the agent in response to the request. A network manager requests, receives, and obtains information about managed objects of each of sensor networks, especially heterogeneous sensor networks, thereby managing the heterogeneous sensor networks in an integrated way.

6 Claims, 3 Drawing Sheets

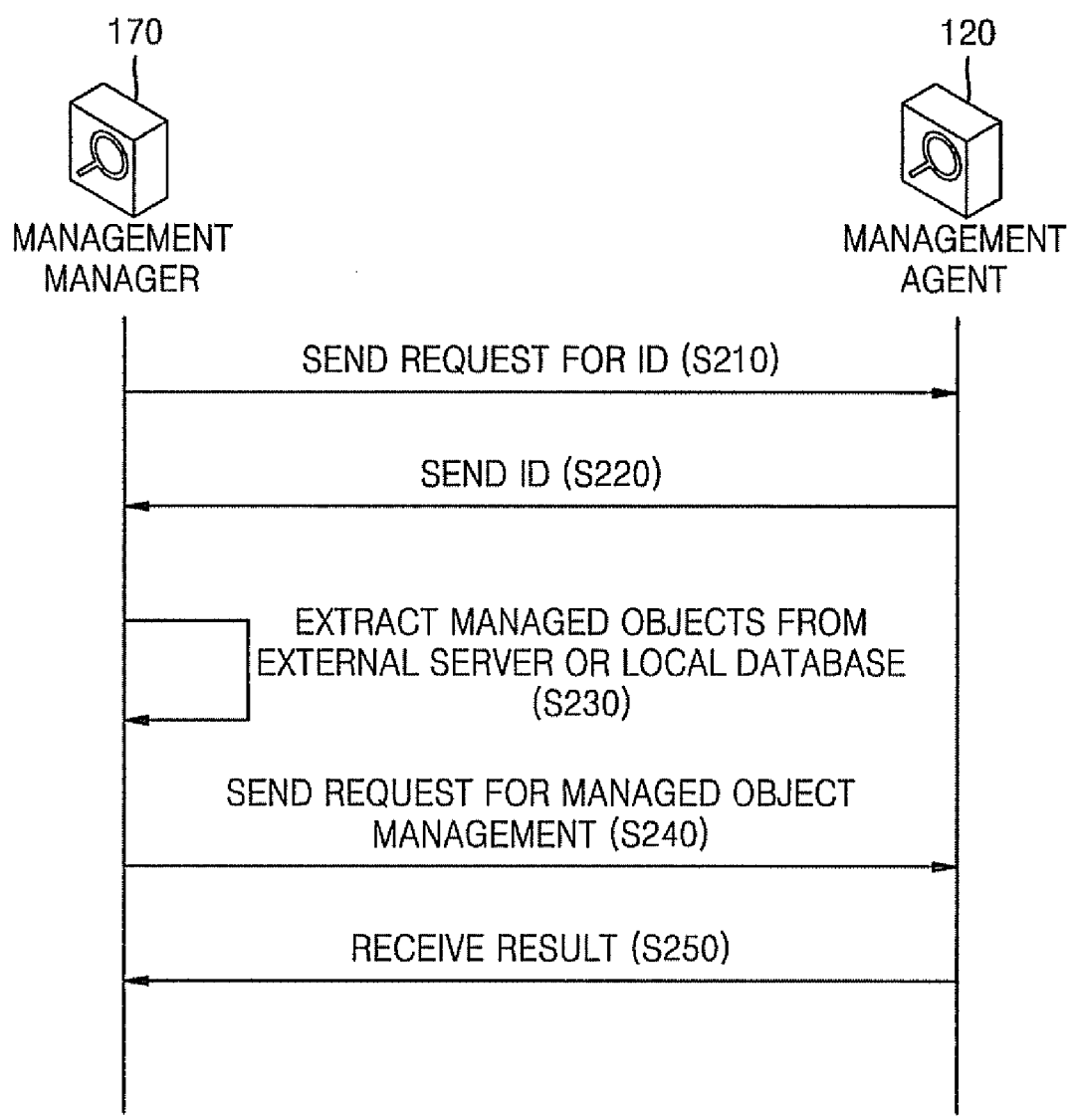

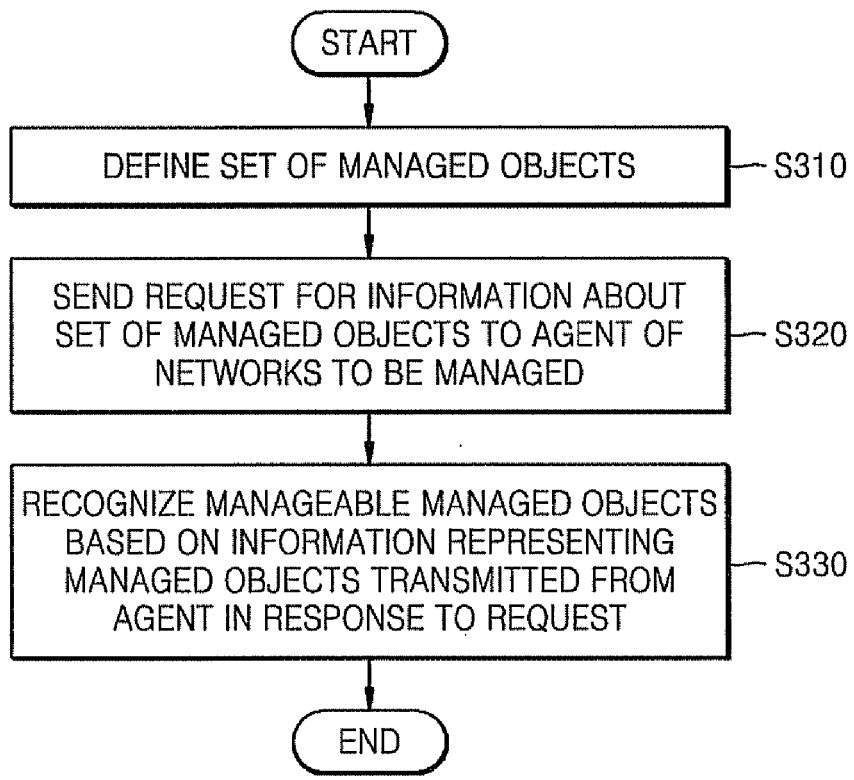
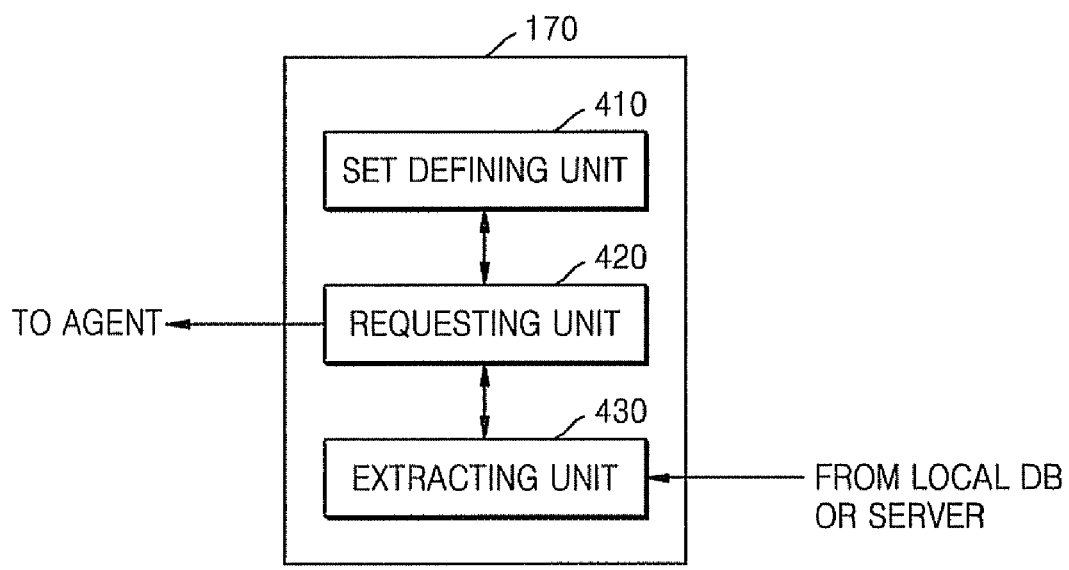

METHOD AND APPARATUS FOR MANAGING NETWORKS

CROSS-REFERENCE TO RELATED PATENT APPLICATION

This application claims the benefit of Korean Patent Application Nos. 10-2008-0084012, filed on Aug. 27, 2008 and 10-2008-0112873, filed on Nov. 13, 2008, in the Korean Intellectual Property Office, the disclosure of which is incorporated herein in its entirety by reference.

BACKGROUND OF THE INVENTION

1. Field of the Invention

The present invention relates to a method and apparatus for managing heterogeneous sensor networks having different managed objects in an integrated way by using an identifier or a profile for a set of management objects of each sensor network in management of networks, especially sensor networks.

2. Description of the Related Art

A sensor network management technology, a technology for monitoring and managing sensor networks, involves monitoring and controlling an operation of a sensor network by obtaining information about an operational state and characteristics of the sensor network or setting information about the characteristics of the sensor network. To this end, managed objects have to be accurately described and the Internet uses a management information base (MIB) on this account.

Conventional sensor network management is targeted only to sensor networks having specific characteristics, making it impossible to manage heterogeneous sensor networks. For example, since a ZigBee-based sensor network and a 6LoWPAN-based sensor network have different managed objects, they can be managed only when managed objects for each of them are separately defined and a management manager and a management agent know identical information about managed objects.

SUMMARY OF THE INVENTION

The present invention provides a method and apparatus in which characteristics of a sensor network, i.e., a managed object set identifier (ID) or a managed object profile which describes a set of managed objects is defined and the defined managed object set ID or the managed object profile (i.e., information about the set of managed objects) is exchanged between a sensor network management manager and a sensor network gateway (or a sensor node), whereby the sensor network management manager can obtain the information about the set of managed objects and manage the sensor network based on the obtained information.

According to an aspect of the present invention, there is provided a method of managing networks. The method includes defining a set of managed objects of each of the networks to be managed, sending a request for information about the set of managed objects to an agent of the networks to be managed, and recognizing manageable managed objects based on information representing the managed objects, which is transmitted from the agent in response to the request.

According to another aspect of the present invention, there is provided an apparatus for managing networks. The apparatus includes a set defining unit defining a set of managed objects of each of the networks to be managed, a requesting unit sending a request for information about the set of managed objects to an agent of the networks to be managed, and an extracting unit extracting manageable managed objects based on information representing the managed objects, which is received in response to the request.

BRIEF DESCRIPTION OF THE DRAWINGS

The above and other features and advantages of the present invention will become more apparent by describing in detail an exemplary embodiment thereof with reference to the attached drawings in which:

FIG. 2 is a flowchart illustrating a procedure of a method of managing networks according to the present invention;

FIG. 3 is a flowchart illustrating the procedure illustrated in FIG. 2 in view of a network manager; and FIG. 4 is a block diagram of an apparatus for managing networks according to the present invention.

DETAILED DESCRIPTION OF THE INVENTION

Figure 1:
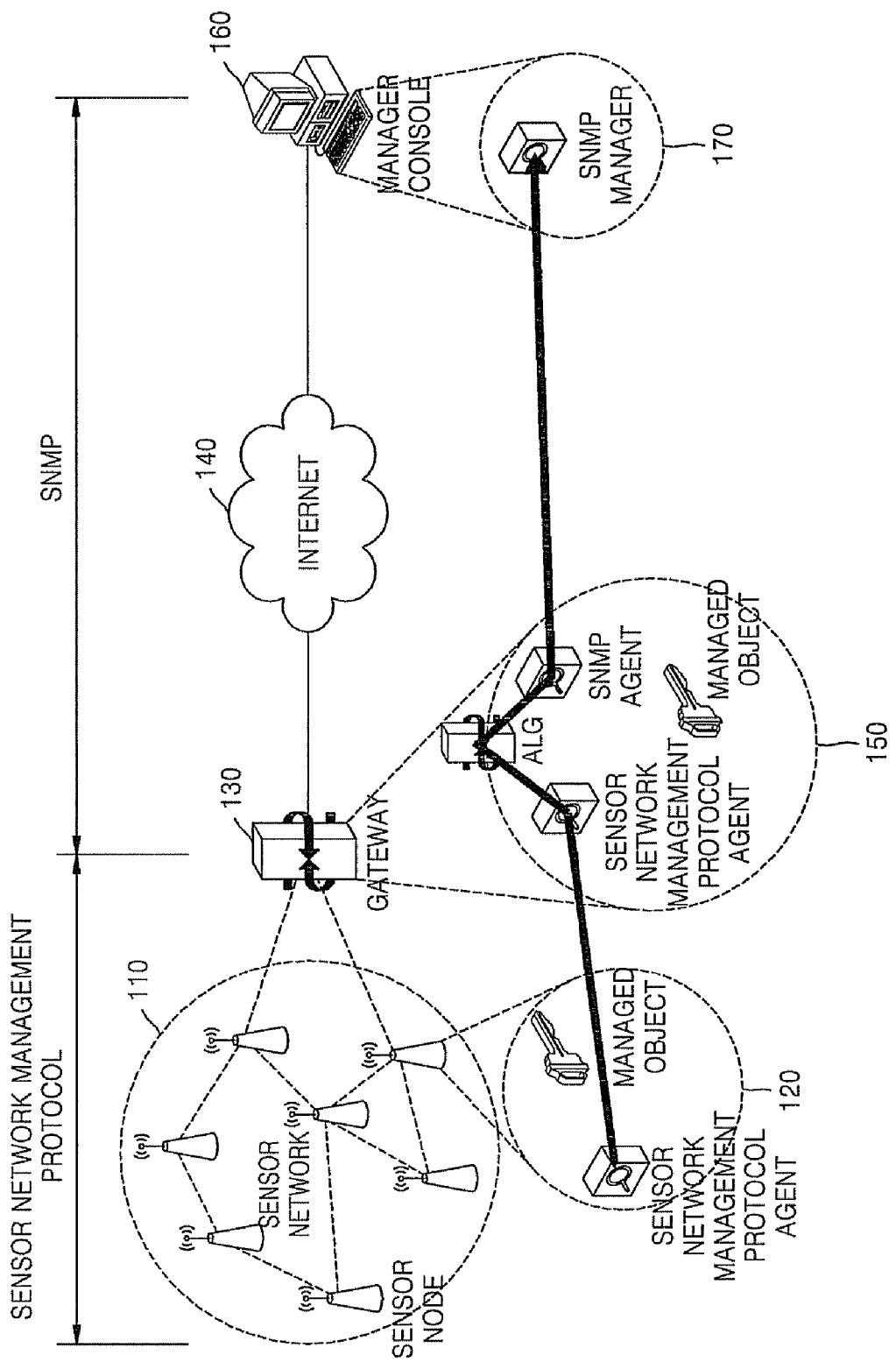
FIG. 1 illustrates a relationship of connection to a general network manager for managing sensor networks.

The present invention will now be described more fully with reference to the accompanying drawings, in which an exemplary embodiment of the invention is shown. In the following description, technical terms known to those of ordinary skill in the art will be omitted. FIG. 1 illustrates a relationship of connection to a general network manager for managing sensor networks. FIG. 2 is a flowchart illustrating a procedure of a method of managing networks according to the present invention. FIG. 3 is a flowchart illustrating the procedure illustrated in FIG. 2 in view of a network manager. FIG. 4 is a block diagram of an apparatus for managing networks according to the present invention.

In the present invention, sensor network managers and a sensor network agent are included and it is necessary to additionally define a managed object set identifier (ID) or a managed object profile for a set of managed objects, which is exchanged between the sensor network managers and the sensor network agent. A managed object indicates a model of a resource which exists in a network management target such as a transmitter, a switching system, a router, or the like.

Referring to FIGS. 1 and 2, a sensor network 110 includes a plurality of sensor nodes and has different managed objects 120 according to hardware, a routing protocol, or the like used by the sensor network 110. Thus, managed objects per sensor network have to be defined and for management of the managed objects, management managers 160 and 170 and a sensor network management agent need to share identical information about the managed objects. In FIG. 1, the sensor network 110 is connected to the management manager (170) through a gateway 130 and an Internet 140 and thin connection lines indicate physical connection, while thick connection lines indicate logical connection.

In a method of managing networks according to the present invention, the gateway 130 or a sensor node sends information about a set of its managed objects, i.e., information about a managed object profile, to the management managers 150 and 170 in order to allow the management managers 150 and 170 to recognize, based on the information, manageable managed objects that can be actually managed and manage the recognized manageable managed objects. In other words, the management managers 150 and 170 obtain managed-object information required for managing the sensor network 110 based on the information.

To this end, it is necessary to define a managed object set ID or a managed object profile identifying a set of managed objects of each sensor network. Once the management manager 170 sends a request for a defined ID or profile to a management agent 120 in operation S210, the management agent 120 sends an ID of a set of managed objects managed by the management agent 120 to the management manager 170 in operation S220. The ID of the set of managed objects, i.e., a managed object set ID, has a one-to-one mapping relationship with a set of manageable managed objects, i.e., a managed object profile. For example, it may be possible that managed object set ID m={managed object 1, managed object 2, . . . , managed object n}.

This mapping relationship may be stored in an external server or a local database in a form shown below.

| Managed Object Set ID | Managed Object Set |
|---|---|
| 1 | {1 3 6 1 4 1 9 9 9 1 1 1 1 1 1}, {1 3 6 1 4 1 9 9 9 1 1 1 1 1 4}, {1 3 6 1 4 1 9 9 9 1 1 2 1 1 6}, . . . |
| . . . | . . . |

The management manager 170, upon receiving the ID, may obtain information about a set of managed objects, i.e., information about a managed object profile, corresponding to the received ID from a local DB or a server of the network, and may show a user interface required for management based on the obtained information in operation S230. The ID may use an object identifier (OID) or a separate identification system.

The profile may be described in a format such as an extensible markup language (XML), ASN.1, or the like. The ID or profile identifying managed objects is analyzed and converted into information indicating manageable managed objects which can be actually managed.

The management manager 170 sends a request for managed object management to the management agent 120 in operation S240 in order to cause the management agent 120 to manage the sensor network 110 the management manager 170 desires to manage. In operation S250, the management manager 170 receives a result of the managed object management.

With reference to FIGS. 3 and 4, a description will now be made of the method and apparatus according to the present invention in view of the management manager 170. A detailed description which has already been made in the above description made with reference to FIG. 2 will not be provided to avoid repetitive description. A set defining unit 410 defines a managed object set ID or a managed object profile identifying a set of managed objects of each sensor network in operation S310. A requesting unit 420 sends a request for information about the set of managed objects to an agent of networks to be managed in operation S320. An extracting unit 430 recognizes manageable managed objects based on information representing the managed received from the agent, i.e., an ID or a profile in operation S330. The network manager (170) may obtain the set of managed objects corresponding to the information representing the managed objects from an accessible local database or from a server of the network.

In other words, once the management manager 170 sends a request for a managed object set ID to the management agent 120, the management agent 120 sends back the requested managed object set ID to the management manager 170, whereby the management manager 170 obtains a set of managed objects from an external server or a local database by using the received managed object set ID. In this way, the management manager 170 can manage even heterogeneous sensor networks.

The method of managing networks according to the present invention is not dependent on a particular network management protocol.

As is apparent from the foregoing description, in the method and apparatus for managing networks according to the present invention, a network manager requests, receives, and obtains information about managed objects of each of sensor networks, especially heterogeneous sensor networks, thereby managing the heterogeneous sensor networks in an integrated way.

The method and apparatus for managing networks according to the present invention can be used regardless of an applied protocol.

The present invention can be embodied as code that is readable by a computer on a computer-readable recording medium. The computer-readable recording medium includes all kinds of recording devices storing data that is readable by a computer system. Examples of the computer-readable recording medium include read-only memory (ROM), random access memory (RAM), CD-ROMs, magnetic tapes, floppy disks, optical data storage devices, and carrier waves such as transmission over the Internet. The computer readable recording medium can also be distributed over network coupled computer systems so that the computer readable code is stored and executed in a distributed fashion.

The present invention has been particularly shown and described with reference to an exemplary embodiment of the present invention. Those of ordinary skill in the art will understand that various changes may be made therein without departing from the spirit and scope of the present invention. Accordingly, the disclosed embodiment should be considered in a descriptive sense only, and not for purposes of limitation. The scope of the present invention is defined not by the detailed description of the present invention but by the appended claims, and all differences within the scope will be construed as being included in the present invention.

What is claimed is:

1. A method of managing networks, the method comprising:
    defining characteristics of a set of managed objects of each of the networks to be managed, to allow the set of managed objects to be identified by a managed object profile where the managed objects are in addition to sensors nodes of the networks;
    sending a request for characteristic information about the set of managed objects to an agent of the networks to be managed; and
    recognizing manageable managed objects based on a transmitted managed object profile included in the characteristic information representing the managed objects which is transmitted from the agent in response to the request;
    wherein the recognizing of the managed objects comprises obtaining the set of managed objects corresponding to the information representing the managed objects from a local database accessible by a network manager and determining whether the obtained set of managed objects are manageable.

2. The method of claim 1, wherein the recognizing of the managed objects comprises obtaining the set of managed objects corresponding to the information representing the managed objects from a server of the network.

3. The method of claim 1, wherein the networks are heterogeneous sensor network.

4. An apparatus for managing networks, the apparatus comprising:
- a set defining unit defining characteristics of a set of managed objects of each of the networks to be managed, to allow the set of managed objects to be identified by a managed object profile where the managed objects are in addition to sensors nodes of the networks;
- a requesting unit sending a request for characteristic information about the set of managed objects to an agent of the networks to be managed; and
- an extracting unit, within a computer, extracting manageable managed objects based on the managed object profile included in the characteristic information representing the managed objects, which is received in response to the request;
- wherein the extracting unit extracts manageable managed objects by obtaining the set of managed objects corresponding to the information representing the managed objects from a local database accessible by the apparatus and determining whether the obtained set of managed objects are manageable.

5. The apparatus of claim 4, wherein the extracting unit extracts manageable managed objects by obtaining the set of managed objects corresponding to the information representing the managed objects from a server of the network.

6. The apparatus of claims 4, wherein the networks are heterogeneous sensor networks.

* * * * *